United States Patent [19]
Thomason

[11] 3,836,762
[45] Sept. 17, 1974

[54] DIVER'S LIGHT APPARATUS

[76] Inventor: Ivor L. Thomason, 2015 S.W. 1st, Des Moines, Iowa 50315

[22] Filed: Apr. 26, 1973

[21] Appl. No.: 354,491

[52] U.S. Cl. .................. 240/26, 240/2 R, 240/88
[51] Int. Cl. ............................................. F21v 31/00
[58] Field of Search ......... 240/26, 2 R, 2 LC, 6.4 F, 240/88

[56] References Cited
UNITED STATES PATENTS
| | | | |
|---|---|---|---|
| 1,316,431 | 9/1919 | Dixon | 240/DIG. 2 |
| 1,338,528 | 4/1920 | Reinewald | 240/26 |
| 2,097,357 | 10/1937 | Watts | 240/26 |
| 2,765,481 | 10/1956 | Manhart et al. | 240/6.4 F |
| 3,502,861 | 3/1970 | Evans | 240/26 |

Primary Examiner—Robert P. Greiner
Attorney, Agent, or Firm—Henderson & Strom

[57] ABSTRACT

A diver's light for various underwater usages which comprises a light means, a container means which may enclose the light means, and a suspension means which connects the light means and container means and holds the light means in positions external to the container means.

5 Claims, 6 Drawing Figures

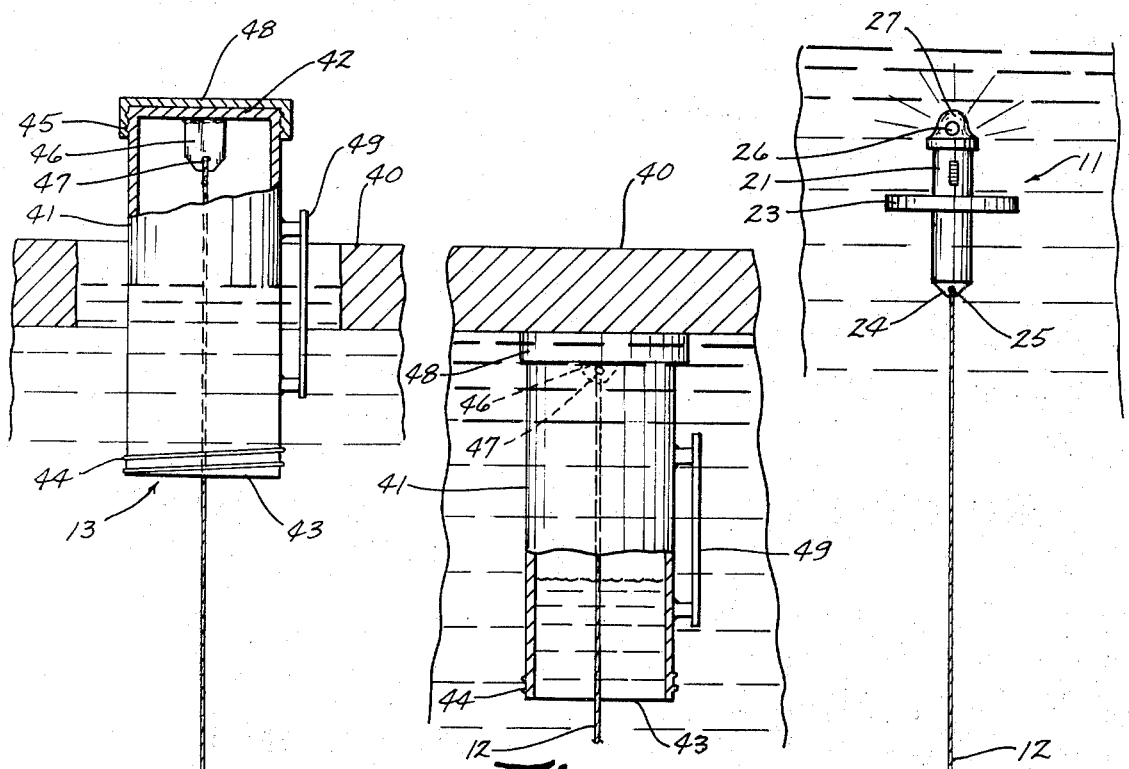
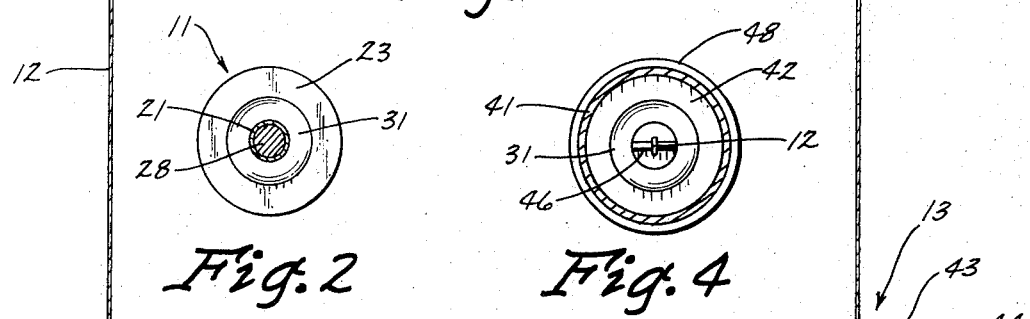
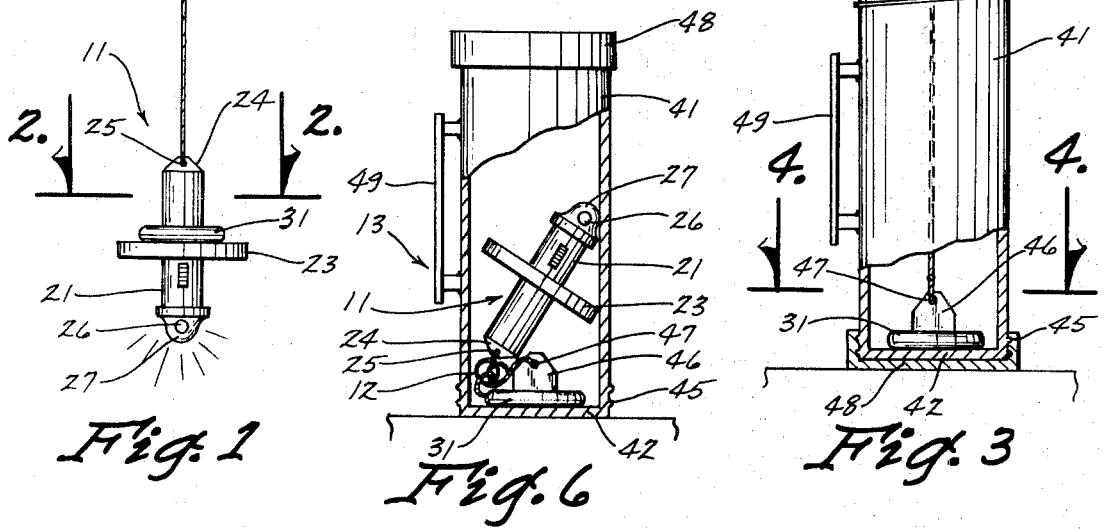

3,836,762

DIVER'S LIGHT APPARATUS

BACKGROUND OF THE INVENTION

A useful diver's light is a necessity for commercial divers, for scientists engaged in oceanographic studies, and for the rapidly increasing numbers of these who dive as a hobby only. Present diver's lights are limited in their utility.

Present lights are either supported from the surface of the water or are hand-carried in the manner of a flashlight. Such lights are often difficult to store, or require separate storage units, and are inconvenient to transport on land. Carrying such lights under water can be taxing physically.

Areas such as caves, places beneath outcroppings of rock or coral, underwater passages of natural surroundings or of foreign surroundings such as sunken ships and the like, and other difficult to reach areas present problems for divers whose surface lights can not reach the area. Also when diving through a hole in the ice, location of the hole for the return thereto is often difficult due to lack of proper illumination.

SUMMARY OF THE INVENTION

This invention comprises a diver's light which includes a light adapted to glow underwater, a container for enclosing the light during use, and which container is capable of holding air therein and resting against the underside of a cave, an ice formation or the like, during which time the light is suspended below the container for full illumination, and which container is also capable of holding water and resting upon the bottom of a body of water, and with the light suspended above by the aid of a flotation device.

In view of the serious defects in the prior art, it is the object of this invention to provide a novel and a useful diver's light.

It is an object of this invention to provide a diver's light which is convenient to transport and to store.

It is another object of this invention to provide a divers light which may be either suspended from a floating condition, from the ceiling of an underwater cave, or from the floor of a body of water, all without modification.

It is a further object of this invention to provide convenience in transportation and storage by means of a unit which is self containable.

It is a further object of this invention to provide an economy of diver movement in underwater transport of the light.

It is a further object of this invention to provide maximum illumination by means of an omni-directional light which is extended away from any underwater surfaces.

These objects and other features and advantages of this invention will become readily apparent by reference to the following description when taken in conjunction with the following drawings.

BRIEF DESCRIPTION OF THE DRAWINGS

The appended drawings illustrate the invention, wherein:

FIG. 1 is an elevational view partially cut away of the diver's light when operated from the surface of the water;

FIG. 2 is a horizontal sectional view taken along the line 2—2 of FIG. 1;

FIG. 3 is an elevational view of the diver's light when operated from the bottom surface of a body of water partially cut away to show the location of the weight;

FIG. 4 is a horizontal sectional view taken along line 4—4 of FIG. 3;

FIG. 5 is a fragmentary elevational view of the diver's light when operated underneath a shelf or projection;

FIG. 6 is an elevational view of the diver's light partially cut away to show the manner of self-containment storage.

DESCRIPTION OF THE PREFERRED EMBODIMENT

Referring now to the drawings, the preferred embodiment of the invention is depicted generally in FIGS. 1 and 3 in two of its possible uses, and in FIG. 6 as a self-storing device.

The invention, as depicted in FIG. 3 is being operated from the bottom of a body of water or from the floor of an underwater cave. The diver's light of this invention comprises generally a light means 11, a container means 13, and a suspension means 12 interconnecting the light means 11 and container means 13.

More particularly, the light means 11 (FIG. 3) includes an elongated case 21. At one end of the case 21 is a projection 24 with a hole 25 whereby the light means 11 is adapted to be connected by the suspension means 12 to the container means 13. At the opposite end of case 21 is an omni-directional light bulb 26 which is covered and protected by a dome shield 27. The light bulb 26 is energized by batteries 28 (FIG. 2) which are contained within the case 21. Attached around the case 21 is a flotation member 23 which is located so that it is mid-way between the ends of case 21.

The suspension means 12 (FIG. 3) consists of a rope or other similar cord-like means. The suspension means 12 attaches to the light means 11 by means of a projection 24 having a hole 25 formed therein, and to the container means 13 by means of a hole 47 formed in another projection 46.

The container means 13 (FIG. 3) includes an elongated hollow member 41 which is closed at one end 42. The elongated member 41 is externally threaded at both ends 44, 45 and is thereby adapted to receive an internally threaded lid 48 at either the open end 44 (FIG. 6) or at the closed end 45 (FIG. 3). Centrally located and inwardly directed within the member 41 is the projection 46 with a hole 47 whereby the container means 13 is adapted to be connected by the suspension means 12 to the light means 11.

A weight member 31 (FIGS. 1 and 3) is moveably mounted upon the suspension means 12 and is located according to the usage of the invention. As depicted in FIGS. 2 and 4, the weight member 31 is annular or ring shaped and has an inner diameter such that it fits over either the projection 46 or the case 21.

When the invention is used at the bottom of a body of water (FIG. 3), the flotation member 23 causes the light means 11 to become buoyant and to rise. The suspension means 12 constrains the light means 11 and is anchored to the bottom by the container means 13, which is filled with water. The moveable weight member 31 is resting against the closed end 42 during this usage.

FIG. 1 illustrates a usage wherein the invention is operated from the surface of a body of water, and is also illustrated as being surrounded by ice 40. FIG. 5 illustrates a usage wherein the invention is operated within an underwater cave, underneath an outcropping of rock or coral or beneath the ice 40. During such usage the container means 13 is partially filled with air, from above the surface of water or bubbled from the diver's tanks. The container means 13 becomes buoyant, and the weight 31 moves downwardly by gravity along the suspension means 12 to rest against the flotation member 23. The weight 31 causes the light means 11 to sink until constrained by the suspension means 12.

While the invention is in use, the lid 48 is attached to the closed end 42 of the container means 13 (FIG. 3). When the invention is not in use and is being transported or stored, the lid 48 covers the open end 43. FIG. 6 depicts the invention in its transportable form. The light means 11, and the coiled up suspension means 12 are enclosed by the container means 13. The whole unit is made conveniently transportable by means of a handle 49.

When the invention is being transported under water, the invention is as depicted in FIG. 6; however, water has been introduced within the container means 13, thereby reducing its buoyancy. This reduced state of buoyancy achieves an economy of energy expenditure on the part of the diver.

Although a preferred embodiment and several usages have been disclosed herein, it is to be remembered that various modifications and alternate constructions can be made thereto without departing from the full scope of the invention, as defined in the appended claims.

I claim:

1. A diver's light comprising:
    floatatable light means tending to rise when submerged in a fluid;
    floatatable container means adapted to enclose said light means;
    suspension means interconnecting said light means and said container means and extendable to hold said light means external of said container means; and
    weight means movable on said suspension means from a first position adjacent to said light means for holding said light means suspended below said container means when said container means is floating in a fluid, to a second position adjacent said container means such that said light means is free to float above said container means when said weight means is in its second position.

2. A diver's light as defined in claim 1, wherein said container means has one openable end and one sealed end;
    connection means on the inside of said sealed end of said container means for connecting the suspension means to said container means, to thereby trap air in the sealed end of said container means.

3. A diver's light as defined in claim 1, wherein said container means has threads on the open end thereof; and
    threaded lid means for enclosing the light means and suspension means in said container means by cooperation with the threads on said open end of said container.

4. The diver's light of claim 3 wherein the sealed end of said container has thread means thereon for storing said threaded lid means when the light means is in use.

5. A diver's light as defined in claim 1 wherein said weight means is slidable along said suspension means for movement between said first position and said second position.

* * * * *